Patented Aug. 3, 1926.

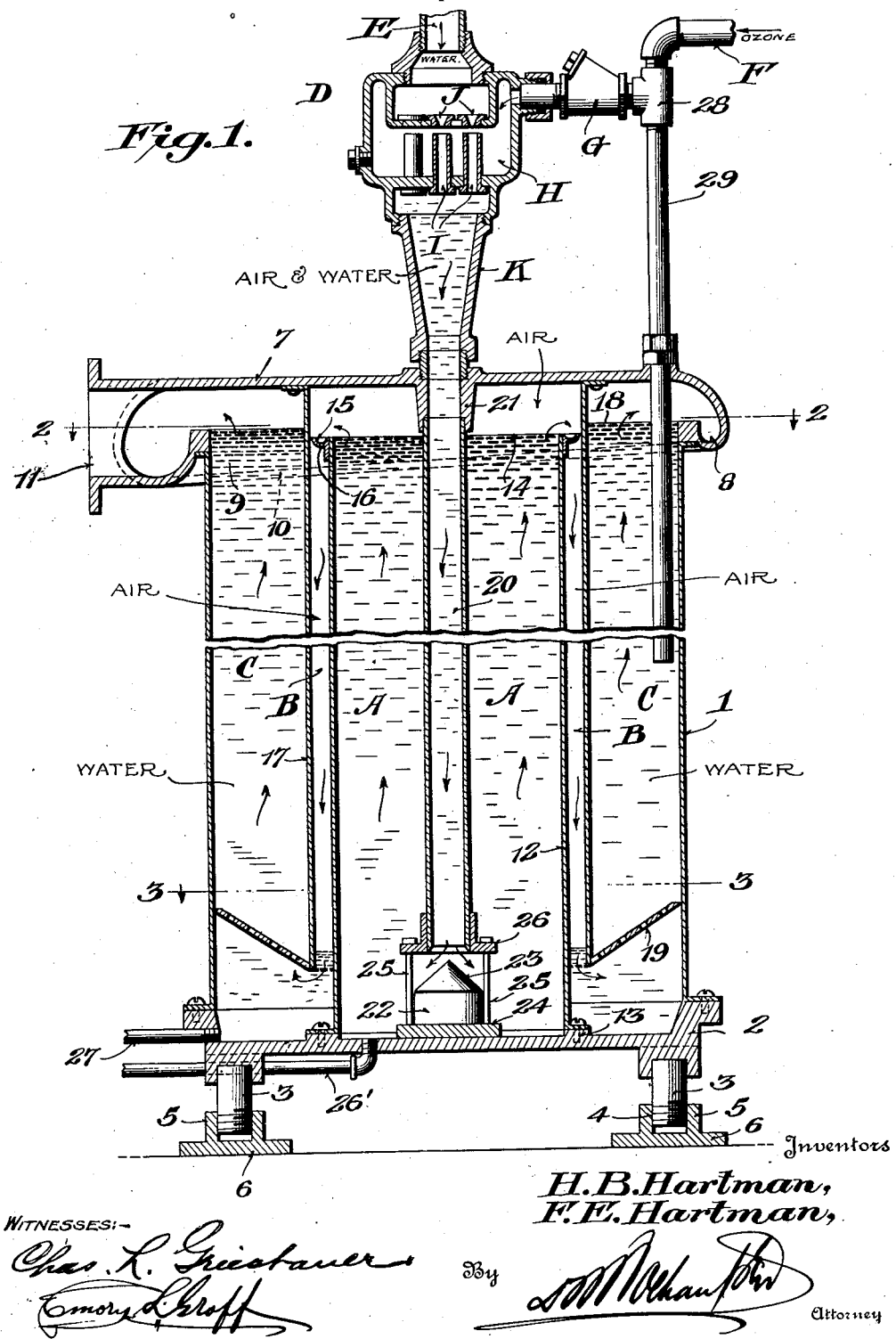

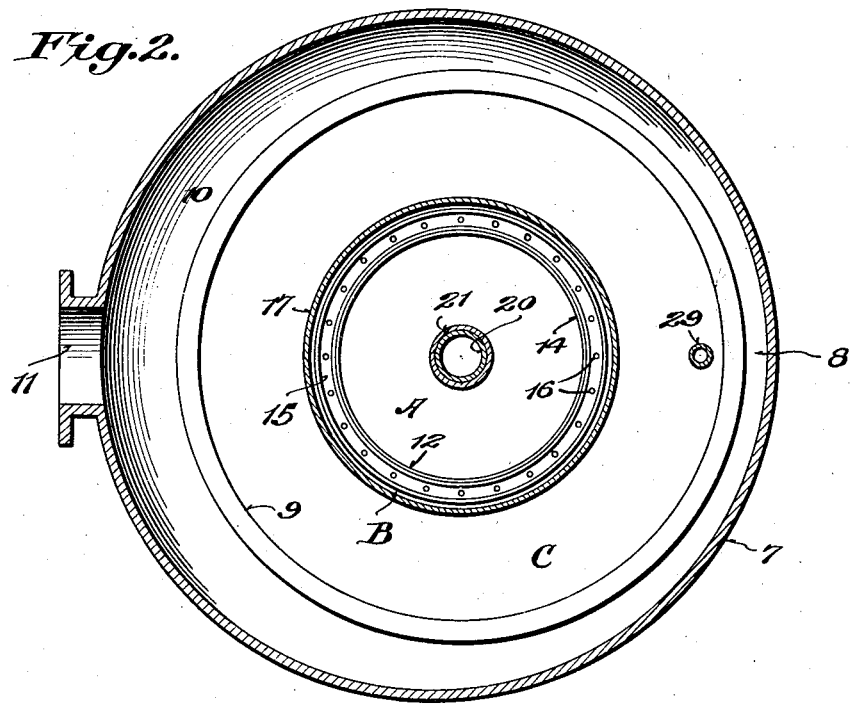
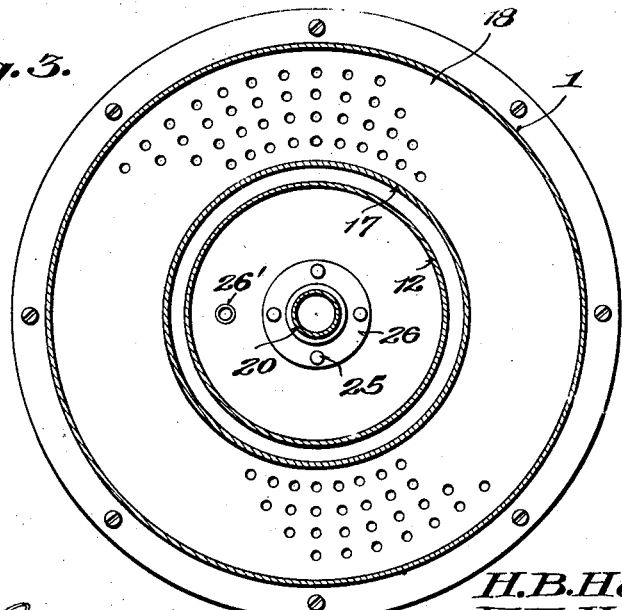

1,594,947

UNITED STATES PATENT OFFICE.

HARRY BUXTON HARTMAN AND FRANK EDWARD HARTMAN, OF SCOTTDALE, PENN-SYLVANIA, ASSIGNORS TO ELECTRIC WATER STERILIZER & OZONE COMPANY, OF SCOTTDALE, PENNSYLVANIA, A CORPORATION OF PENNSYLVANIA.

FLUID-DIFFUSING DEVICE.

Application filed April 27, 1922. Serial No. 556,901.

This invention relates to water purification and more particularly to a novel device for effectually diffusing a gaseous purifying agent such as ozone throughout the body of water to be treated.

To effect an adequate purification of the water it is desirable that the same be thoroughly permeated by the gaseous ozone, because, since ozone is only sparingly soluble in water, no benefit can be expected from a chemical solution of the water and ozone. Accordingly, a primary object of the invention is to provide a device for thoroughly and adequately diffusing the ozone throughout the body of water under conditions that will minimize the effects of surface tension and not be dependent on mechanical mixing, thereby insuring a thorough purification of the water.

To that end the present invention proposes to inject the ozone and water under pressure into a device having a novel arrangement of diffusing chambers thereby causing the ozonized air, to thoroughly permeate the water and enable the ozone to actively attack the bacteria, both initially through the medium of an injector and subsequently by further subjecting the water to the action of ozone as it continues its passage through the device.

Another object of the invention is to provide a simple and practical construction that may be installed within a minimum space and yet provide ample capacity for insuring that the water and ozone are in contact for a sufficient length of time to insure proper purification.

A further object of the invention is to provide a construction that may be readily assembled and installed with a minimum of expense and labor and which also provides means for preventing the backing-up of water into the connections leading to the ozone generator.

With the above and other objects in view which will more readily appear as the nature of the invention is better understood, the same consists in the novel construction, combination and arrangement of parts hereinbefore more fully described, illustrated and claimed.

A preferred and practical embodiment of the invention is shown in the accompanying drawings in which:—

Figure 1 is a vertical sectional view of the improved device.

Figure 2 is a horizontal sectional view taken on the line 2—2 of Figure 1.

Figure 3 is a horizontal sectional view taken on the line 3—3 of Figure 1.

Similar reference characters designate corresponding parts throughout the several figures of the drawings.

In carrying the invention into effect it is proposed to provide a main tubular casing or shell 1 carried by a base 2 adjustably supported on the posts 3 which are preferably threaded as indicated at 4 to fit into the sockets 5 of the foot castings 6. The purpose of mounting the base 2 in this manner is to enable the same to be made level in event that the device is to be installed upon an uneven surface; and owing to the fact that uniform and equal distribution of ozone and water throughout the device is necessary, it is desirable to arrange the base so that it will be entirely level.

The upper end of the shell may be provided with a novel cap 7 which is of larger diameter than the shell and formed with an interior delivery channel 8 which receives the treated water through the opening 9, as will hereinafter more fully appear, and discharges the same over the inclined bottom wall 10 thereof into the outlet 11.

The interior of the shell is divided into a plurality of concentric diffusing chambers A, B and C, the inner or central chamber A being formed by the tubular upright casing 12 which is secured to the up-standing annular rib 13 of the base 2 and extends upwardly to substantially the plane of the top of the shell 1 as indicated at 14. Surrounding the outer side of the edge 14 is a gutter 15 having perforations 16 which are spaced from the outer side of the casing 12 so that water dropping therefrom will fall through the chamber B in the form of a fine rain.

The other wall of the chamber B is formed by a tubular casing member 17 suspended from the cap 7 and spaced relatively close to the casing member 12 so that the chamber B, as compared with chambers A and C, is relatively constricted or narrow. The lower end of the casing 17 preferably carries therewith a frusto-conical diffusing plate 18 having a plurality of perforations 19 distributed throughout its surface so that all of the water and ozone discharged from the chamber B into the chamber C will percolate through the openings and thus effect uniform distribution of the water and ozone throughout the chamber C. The upwardly inclined position of the plate 18, materially assists in the effective distribution of the water and ozone.

Referring now more particularly to the manner in which the water and ozone is supplied to the device it will be observed that a suitable injector device D is provided. This device is connected with a main water supply E and also with the ozone supply pipe F through a line containing a check valve G. The pressure of water issuing from the jets J into the spaced nozzles I causes a partial vacuum in the chamber H thus causing the ozone to be forced into the nozzle elements with the water and discharging both in the form of a spray into the portion K of the injector which communicates with the central tube 20 carried by the boss 21 at the inside of the cap 7. This tube 20 extends downwardly into the central chamber A and is provided at its lower end with a novel valve unit and spreader consisting of a valve 22 having a conical top portion 23 adapted to fit into the flared mouth of the tube 20. This valve is hollow or otherwise constructed to be buoyant and held captive by a suitable cage consisting of the platform 24 and rods or bars 25 connecting the platform with the collar 26 on the end of the tube.

Due to the conical head of the valve 23, the same accurately seats in the flared end of the tube 20 when the device is not in operation, and on the other hand, when the injector device D is functioning, the valve is unseated and acts as a spreader for uniformly distributing the water and ozone discharged into the pipe 20 throughout the lower part of the chamber A.

The functioning of the injector device D causes an effective preliminary mixing of the water and the ozone and discharges the spray of water and ozone rapidly downward through the tube 20 until it strikes the conical head 23 of the valve 22 which spreads the fluids uniformly into the bottom of the chamber A. The water and ozonized air pass upward through the chamber A, and it is in this chamber that perfect diffusion begins. As the area of the chamber A is many times larger than that of the tube 20, the water passes upwardly through the chamber A at a much slower rate, and the ozonized air introduced at the bottom of the chamber A will pass upwardly through the water in the chamber A much more rapidly than the water because of its relative lightness. Therefore, the water becomes more or less an obstacle to the passing of ozonized air and causes the air to use every possible means of rising more rapidly to the surface, thereby seeking the intermolecular spaces of the water and completely filling them. In this way the ozonized air is brought into contact with the entire body of water due to the diffusion through the intermolecular spaces.

The primary function, therefore, of the chamber A is to obtain complete diffusion of the ozonized air through the water in the chamber and when the capacity of the chamber exceeds the maximum, the water will spill over into the gutter 15 and filter through the same, falling in the form of fine rain through the ozonized air under pressure trapped in chamber B. It will, of course, be understood that water will collect in chambers A and C, but, due to the relative difference in areas of said chambers, air will fill the chamber B thus providing an air space which permits drops of water in the form of rain to fall from the gutter 15 and pass through an atmosphere of ozonized air. Since the chamber B is of much smaller area than the chamber A, air will obviously collect above the chamber A and form an air pocket which extends into and throughout the chamber B in proportion to the pressure corresponding to the height of the column of water in the outer chamber C. For example, if the column of water in the chamber C measures 48 inches the pressure of air in the chamber B will be 48 inches of water. In connection with the outer chamber C it is pointed out that since the same is open to the atomsphere no back pressure will drive water up into the pipe 29 when the machine stops, as will hereinafter be more fully described.

Because of the fact that the pressure of the air in the chamber B is sufficient to overcome the surface tension of the droplets of water, the same will be thoroughly permeated with ozone during its passage through the chamber B. From the bottom of the chamber B the water and ozone then make their way upward through the foraminous inclined plate 18 into the chamber C where the water collects to the full height of the column extending from the bottom plate 2 to the outlet edge 9 of the cap plate 7 while the ozone bubbles upwardly through the same. As soon as the chamber B becomes filled with air and has obtained a pressure equivalent to the height of water in the chamber C it will be capable of balancing the water column in the said chamber C, but, as soon as more air pressure accumulates in the chamber B, the pressure of the water column in the chamber C will be overcome and thus the ozonized air will be forced upward through the chamber C in precisely the same manner as in the chamber A so that the same diffusing result is obtained in the chamber C as in the chamber A, both of which are of relatively large area.

For the purpose of draining the chambers A, as well as the chambers B and C, the drain connections 26' and 27 may be provided.

In connection with the valve 22 it will be observed that the same is of considerable practical importance in the functioning of the apparatus because it serves to prevent water from the chamber A backing up into the tube 20 and thus making its way into the injector device D after the same has been shut off. It must be remembered that when the device is in operation it is being continually supplied with substantially equal volumes of ozonized air and water under pressure through the central supply tube 20 which will have the effect of compressing air in the chamber B equivalent to the height of water in the outside chamber C, and in addition thereto also maintaining a slightly excessive pressure sufficient to keep the water in the column C in movement. Or, in the case of initial operation, to overcome the inertia of the column of water in the chamber C. This excess pressure in the chamber B will, upon the closing down of the apparatus, tend to dissipate in both directions. That is to say, a portion of the pressure in the chamber B will dissipate through the chamber C which is open to the atmosphere resulting in discharging a relatively small amount of water into the delivery trough 8 of the cap 7, while another portion of the pressure will tend to dissipate through the water in the chamber A. The pressure dissipated through the column of water in the chamber A would force the water upward through the supply tube 20 if the valve 22 were not provided and also except for the check valve G might back up in the connections leading to the ozone generator; such a condition however is prevented by the provision of the check valve G.

As an additional safeguard increasing the factor of safety, against water passing by the check valve G before it has an opportunity to seat or close a safety trap consisting of a T-connection 28 and a pipe 29 is provided. This T-connection is interposed between the check valve G and the ozone supply line F while the pipe 29 has its discharge end located in the chamber C. This arrangement, however, is merely an additional precaution to protect the ozone generators against ingress of water. As the amount of water passing into the chamber C through the trap pipe 29 is extremely negligible, the possibility of contamination from this source is practically nil.

From the foregoing it will be apparent that in operation the raw water enters the pipe E and passes into the injector device D. The vacuum set up in the chamber H of the injector device causes ozone to be drawn in through the line including the check valve G from the ozone supply line F and, as the water passes from the jets J of the injector into the tubes I, ozone is drawn along with it and discharged with considerable force into the substantially conical preliminary mixing chamber formed by the portion K of the injector device. As the water and ozone proceed downwardly through the pipe 20, the water is preliminarily acted upon by the ozone and when the chamber A becomes filled with water the ozone carried into the device through the pipe F will bubble upwardly through the water in the chamber A and collect above the level of water in the chamber A while the water spills over the edge 14 into the gutter 15.

As previously explained the chamber B formed by the walls 12 and 17 become filled with ozonized air due to the relative pressure of water in the chambers A and C and, therefore, as the water falls from the gutter 15 it passes through an atmosphere of ozone which is under pressure and therefore sufficient to penetrate the surface of the water droplets and cause their effective purification. As the ozone issues from the bottom of the chamber B, the foraminous deflector plate 18 distributes the same thoroughly throughout the body of water in chamber C, and as the ozone bubbles upwardly through the water in the chamber C, further treatment takes place, thereby insuring adequate purification.

Without further description it is thought that the features and advantages of the invention will be readily apparent to those skilled in the art and it will of course be understood that changes in the form, proportion, and minor details of construction may be resorted to without departing from the spirit of the invention or scope of the appended claims.

We claim:—

1. An ozonizer or the like including inner and outer liquid holding chambers, and an intermediate chamber containing a compressed body of ozone, and means for raining water through said intermediate chamber.

2. An ozonizer or the like including inner and outer liquid holding chambers, and an intermediate gaseous-fluid chamber, means for circulating ozone to said chamber, and means for producing a rainfall of water downwardly through the body of ozone confined in said gaseous-fluid chamber.

3. An ozonizer or the like consisting of an outer shell and base and cap members, interior casing members respectively supported by the base and the cap in telescopically spaced relation to provide a relatively large central chamber, a relatively large outer chamber and a relatively narrow intermediate chamber, the said chambers being in communication with each other, means for supplying liquid and gas under pressure to the central chamber consisting of an injector device having a valve at its lower end portion, and a trough formed in the cap portion for delivering treated liquid from the outer chamber.

4. An ozonizer or the like consisting of an outer shell and base and cap members, a pair of casings arranged in the interior of the shell and spaced relatively close together, the inner of said casings being carried by the base and the outer being carried by the cap, an inlet tube for water and ozone under pressure having its discharge end located adjacent the bottom of the chamber formed by the inner casing, and a valve associated with the discharge end of said inlet tube.

5. An ozonizer or the like consisting of an outer shell and base and cap members, a pair of casings arranged in the interior of the shell and spaced relatively close together, the inner of said casings being carried by the base and the outer being carried by the cap, and said casings respectively terminating short of the cap and short of the base, a perforated gutter carried by the upper edge of the inner casing, and a foraminous plate carried by the lower edge of the outer casing, and a valved inlet tube for supplying water and ozone to the chamber formed by the inner casing.

6. An ozonizer or the like consisting of a shell and base and cap members, a pair of casings arranged in the interior of the shell and spaced relatively close together, the inner of said casings being carried by the base and the outer being carried by the cap, and said casings respectively terminating short of the cap and short of the base, a perforated gutter carried by the upper edge of the inner casing, and a foraminous plate carried by the lower edge of the outer casing, said plate being inclined upwardly and extending from the casing to the shell, and a valved inlet tube for supplying water and ozone to the chamber formed by the inner casing member.

7. An ozonizer or the like including a container, means for providing three interior concentric and communicating chambers, and means whereby water from the innermost chamber will pass through the middle chamber in the form of a fine rain, and thence to the outer chamber to be discharged.

8. An ozonizer or the like including a container and base and shell cap members, said cap member including a body having a depending portion formed into a channel having an inclined bottom, and an outlet connection formed on the cap at the bottom of said inclined channel.

9. In an ozonizer or the like, a container having a plurality of diffusing chambers, and means for supplying ozone and water under pressure to said chambers consisting of an injector device, connections between said injector device and source of water and ozone supply, a valved tube extending from said injector device into the container, a valve in the connections between the injector device and the source of ozone supply.

10. In an ozonizer or the like, a container having a plurality of diffusing chambers, means for supplying ozone and water under pressure to said chambers consisting of an injector device, ozone and water supply connections for said injector device, a valved tube extending from said injector device into the container, a valve in the connection between the injector device and the source of ozone supply, and a water trap also formed in the connection between the injector device and the source of ozone supply, said trap including a pipe having its discharge end located within the container below the liquid level thereof.

In testimony whereof we hereunto affix our signatures.

HARRY BUXTON HARTMAN.
FRANK EDWARD HARTMAN.